(12) United States Patent
Liu

(10) Patent No.: US 10,829,069 B2
(45) Date of Patent: Nov. 10, 2020

(54) VEHICLE-CARRIED SYSTEM AND CONTROL METHOD FOR VEHICLE FACILITIES

(71) Applicant: BOE TECHNOLOGY GROUP CO., LTD., Beijing (CN)

(72) Inventor: Kairan Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 340 days.

(21) Appl. No.: 15/741,363

(22) PCT Filed: May 23, 2017

(86) PCT No.: PCT/CN2017/085499
§ 371 (c)(1),
(2) Date: Jan. 2, 2018

(87) PCT Pub. No.: WO2018/000999
PCT Pub. Date: Jan. 4, 2018

(65) Prior Publication Data
US 2019/0016281 A1 Jan. 17, 2019

(30) Foreign Application Priority Data
Jun. 27, 2016 (CN) .......................... 2016 1 0479977

(51) Int. Cl.
*B60R 16/03* (2006.01)
*B60R 16/037* (2006.01)
(Continued)

(52) U.S. Cl.
CPC .......... *B60R 16/0373* (2013.01); *B60N 2/002* (2013.01); *B60N 2/0248* (2013.01);
(Continued)

(58) Field of Classification Search
None
See application file for complete search history.

(56) References Cited

U.S. PATENT DOCUMENTS 5,812,067 A * 9/1998 Bergholz ........... G06K 9/00362
340/5.52
6,100,811 A * 8/2000 Hsu .................... B60H 1/00642
340/426.36
(Continued)

FOREIGN PATENT DOCUMENTS

CN 101844548 A 9/2010
CN 101934779 A 1/2011
(Continued)

OTHER PUBLICATIONS

Chinese office action dated Oct. 25, 2017 for corresponding CN application 201610479977.5 with English translation attached.
(Continued)

*Primary Examiner* — Bhavesh V Amin
(74) *Attorney, Agent, or Firm* — Nath, Goldberg & Meyer; Joshua B. Goldberg

(57) ABSTRACT

The present application provides a vehicle-carried system and a control method for vehicle facilities. The vehicle-carried system includes a characteristic information acquisition unit configured to acquire human body characteristic information; a storage unit configured to store pieces of human body characteristic information and pieces of identity information corresponding to the pieces of human body characteristic information; a matching unit configured to match the human body characteristic information acquired by the characteristic information acquisition unit with the pieces of human body characteristic information stored in the storage unit, and determine identity information corresponding to the human body characteristic information acquired by the characteristic information acquisition unit
(Continued)

according to a result of the matching; and a control unit configured to control facilities in a vehicle according to the determined identity information.

13 Claims, 2 Drawing Sheets

(51) Int. Cl.
*B60R 25/25* (2013.01)
*B60N 2/00* (2006.01)
*B60R 25/102* (2013.01)
*B60R 25/30* (2013.01)
*B60N 2/02* (2006.01)
*G06K 9/00* (2006.01)

(52) U.S. Cl.
CPC .......... *B60R 16/037* (2013.01); *B60R 25/102* (2013.01); *B60R 25/25* (2013.01); *B60R 25/252* (2013.01); *B60R 25/257* (2013.01); *B60R 25/305* (2013.01); *G06K 9/00087* (2013.01)

(56) References Cited

U.S. PATENT DOCUMENTS

| | | | | |
|---|---|---|---|---|
| 6,252,978 | B1* | 6/2001 | Grantz | B60R 25/252 180/272 |
| 6,271,745 | B1* | 8/2001 | Anzai | G07C 9/00563 340/5.53 |
| 6,633,090 | B2* | 10/2003 | Harter | B60R 25/04 307/10.3 |
| 6,690,260 | B1* | 2/2004 | Ashihara | B60K 28/02 340/5.2 |
| 6,810,309 | B2* | 10/2004 | Sadler | B60R 25/04 701/1 |
| 7,864,029 | B2* | 1/2011 | Huang | B60R 25/04 340/426.1 |
| 8,344,849 | B2* | 1/2013 | Larsson | B60R 25/25 340/426.11 |
| 8,548,209 | B2* | 10/2013 | Lung | G06K 9/00604 340/575 |
| 8,600,581 | B2* | 12/2013 | Lee | H04L 9/3215 701/2 |
| 9,085,269 | B2* | 7/2015 | Abuelsaad | B60R 21/01516 |
| 9,144,389 | B2* | 9/2015 | Srinivasan | A61B 5/0408 |
| 9,177,429 | B2* | 11/2015 | Lawrenson | B60W 50/085 |
| 9,272,689 | B2* | 3/2016 | Fung | G06K 9/00536 |
| 9,381,890 | B2* | 7/2016 | Lee | B60K 28/02 |
| 9,547,692 | B2* | 1/2017 | Poulsen | G06Q 90/00 |
| 9,789,788 | B2* | 10/2017 | Chen | B60N 2/0248 |
| 10,204,261 | B2* | 2/2019 | Haley | G06K 9/00845 |
| 10,228,814 | B1* | 3/2019 | Poulsen | G06Q 90/00 |
| 10,417,910 | B2* | 9/2019 | Scofield | G06F 16/29 |
| 2002/0023215 | A1* | 2/2002 | Wang | G06Q 20/00 713/171 |
| 2002/0080014 | A1* | 6/2002 | McCarthy | B60N 2/002 340/426.1 |
| 2002/0107010 | A1* | 8/2002 | Witte | B60R 25/2081 455/418 |
| 2002/0152010 | A1* | 10/2002 | Colmenarez | B60R 25/2045 701/36 |
| 2003/0204290 | A1* | 10/2003 | Sadler | B60R 25/04 701/1 |
| 2004/0217850 | A1* | 11/2004 | Perttunen | B60R 25/241 340/426.17 |
| 2005/0149741 | A1* | 7/2005 | Humbel | B60R 25/04 713/186 |
| 2005/0149742 | A1* | 7/2005 | Weis | G07C 9/00563 713/186 |
| 2005/0261807 | A1* | 11/2005 | Sorensen | B60N 2/002 701/2 |
| 2007/0060056 | A1* | 3/2007 | Whitaker | H04M 1/72533 455/41.2 |
| 2007/0197261 | A1* | 8/2007 | Humbel | G07C 9/257 455/558 |
| 2008/0252412 | A1* | 10/2008 | Larsson | B60R 25/25 340/5.2 |
| 2009/0284359 | A1* | 11/2009 | Huang | B60R 25/04 340/426.1 |
| 2010/0097178 | A1* | 4/2010 | Pisz | H04L 63/0861 340/5.72 |
| 2012/0053793 | A1* | 3/2012 | Sala | B60N 2/002 701/45 |
| 2012/0053794 | A1* | 3/2012 | Alcazar | B60N 2/0244 701/48 |
| 2012/0101690 | A1* | 4/2012 | Srinivasan | A61B 5/0408 701/45 |
| 2015/0025705 | A1* | 1/2015 | Burger | B60R 16/037 701/1 |
| 2015/0046060 | A1* | 2/2015 | Nikovski | B60R 16/037 701/99 |
| 2015/0120135 | A1* | 4/2015 | Lawrenson | B60W 50/085 701/36 |
| 2016/0300411 | A1* | 10/2016 | Isaacson | G06Q 20/34 |

FOREIGN PATENT DOCUMENTS

| | | |
|---|---|---|
| CN | 202130310 U | 2/2012 |
| CN | 103303257 A | 9/2013 |
| CN | 103996229 A | 8/2014 |
| CN | 203753082 U | 8/2014 |
| CN | 203996107 U | 12/2014 |
| CN | 104816694 A | 8/2015 |
| CN | 105172716 A | 12/2015 |
| CN | 106004735 A | 10/2016 |
| DE | 102014013276 A1 | 3/2016 |
| EP | 2428413 B1 | 3/2013 |

OTHER PUBLICATIONS

International search report dated May 23, 2017 for corresponding international application PCT/CN2017/085499 with English translation attached.

* cited by examiner

VEHICLE-CARRIED SYSTEM AND CONTROL METHOD FOR VEHICLE FACILITIES

CROSS-REFERENCE TO RELATED APPLICATIONS

The present application claims the priority of Chinese Patent Application No. 201610479977.5 filed on Jun. 27, 2016, the contents of which are incorporated herein in their entirety by reference.

TECHNICAL FIELD

The present application relates to the field of vehicle technology, and particularly to a vehicle-carried system and a control method for vehicle facilities.

BACKGROUND

Currently, a family vehicle may be steered by different drivers, and thus a vehicle key needs to be transferred between different drivers, making it easy to be lost or not founded. Once the driver is changed, the driver's seat needs to be readjusted. In addition, each driver has his own preference in using vehicle display, and every time the driver is changed, a new driver needs to perform a series of controls and get accustomed to the vehicle display. Therefore, a smart vehicle-carried system that can automatically recognize different drivers and automatically control vehicle settings according to the driver's own habits is necessary.

SUMMARY

According to an aspect of the present application, there is provided a vehicle-carried system, which includes a characteristic information acquisition unit configured to acquire human body characteristic information; a storage unit configured to store pieces of human body characteristic information and pieces of identity information corresponding to the pieces of human body characteristic information; a matching unit configured to match the human body characteristic information acquired by the characteristic information acquisition unit with the pieces of human body characteristic information stored in the storage unit, and determine identity information corresponding to the human body characteristic information acquired by the characteristic information acquisition unit according to a result of the matching; and a control unit configured to control facilities in a vehicle according to the determined identity information.

According to an embodiment of the present application, the human body characteristic information may include fingerprint information, and the characteristic information acquisition unit may include a fingerprint recognition sensor configured to acquire the fingerprint information.

According to an embodiment of the present application, the vehicle-carried system may further include a camera unit and a transmission unit. The camera unit may be configured to take a picture in a case where the human body characteristic information including the fingerprint information fails to be matched with any piece of human body characteristic information stored in the storage unit, and the transmission unit may be configured to transmit the picture taken by the camera unit to a vehicle's owner.

According to an embodiment of the present application, the human body characteristic information may include facial information, and the characteristic information acquisition unit may include a face recognition module configured to acquire the facial information.

According to an embodiment of the present application, the vehicle-carried system may further include a transmission unit configured to transmit the facial information acquired by the face recognition module in a case where the human body characteristic information including the facial information fails to be matched with any piece of human body characteristic information stored in the storage unit.

According to an embodiment of the present application, the vehicle-carried system may further include a reception unit configured to receive control information sent by the vehicle's owner, and control a vehicle door to be either opened or not opened according to the control information.

According to an embodiment of the present application, the control unit may include at least one of a seat control module, a music play control module and an exterior body color control module.

According to an embodiment of the present application, the control unit may include the music play control module, and the vehicle-carried system may further include a sorting unit. In a case where a plurality of people are in the vehicle, the sorting unit may be configured to sort priorities of the people according to a stored sorting mode, and the music play control module may be configured to control a play order of music according to the priorities of the people.

According to an embodiment of the present application, the vehicle-carried system may further include a speech recognition unit and an alarm unit. The speech recognition unit may be configured to recognize speech information, and the alarm unit may be configured to compare the speech information recognized by the speech recognition unit with pieces of stored alarm speech information, and make an alarm according to a result of the comparison.

According to an embodiment of the present application, the vehicle-carried system may further include a vehicle display unit configured to perform display according to the determined identity information in a case where the matching unit performs the matching successfully.

According to an embodiment of the present application, the vehicle-carried system may include a plurality of characteristic information acquisition units disposed on vehicle doors, respectively.

According to an embodiment of the present application, there is provided a control method for vehicle facilities including: acquiring human body characteristic information; matching the acquired human body characteristic information with pieces of stored human body characteristic information, and determining identity information corresponding to the acquired human body characteristic information according to a result of the matching; and controlling facilities in the vehicle according to the determined identity information.

According to an embodiment of the present application, the step of acquiring human body characteristic information may include acquiring fingerprint information or acquiring facial information.

According to an embodiment of the present application, the control method for vehicle facilities may further include: in a case where the acquired human body characteristic information fails to be matched with any piece of stored human body characteristic information, acquiring facial information and transmitting the facial information to a vehicle's owner.

According to the vehicle-carried system of the present application, human body characteristic information of a person to enter into the vehicle may be acquired by the characteristic information acquisition unit. When the acquired human body characteristic information matches with a piece of the human body characteristic information stored in the storage unit, it indicates that the person to enter into the vehicle is a safe user. In this case, the matching unit can determine the identity information of the person, and the control unit can control the facilities in vehicle according to the determined identity information, thus saving time and effort on personalized control for vehicle driving.

BRIEF DESCRIPTION OF THE DRAWINGS

The accompanying drawings, which constitute a part of the specification, are provided for a further understanding of the present invention, and for explaining the present invention together with the following specific implements, but not intended to limit the present invention. In the drawings.

DETAILED DESCRIPTION

To make those skilled in the art better understand the technical solutions of the present application, embodiments of the present application will be further described in detail below in conjunction with the accompanying drawings and detailed implements.

Figure 1:
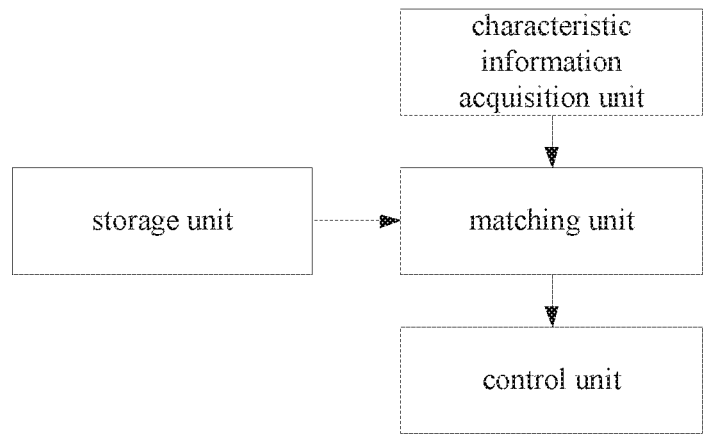
FIG. 1 is a schematic block diagram of a vehicle-carried system according to an embodiment of the present application.

FIG. 1 is a schematic block diagram of a vehicle-carried system according to an embodiment of the present application.

As illustrated in FIG. 1, the vehicle-carried system according to the embodiment may include a characteristic information acquisition unit, a storage unit, a matching unit and a control unit.

According to an embodiment of the present application, the characteristic information acquisition unit may be mounted at a vehicle door and configured to acquire human body characteristic information. However, the present application is not limited thereto. The position where characteristic information acquisition unit is mounted is not limited to the vehicle door, and may be other position of the vehicle. According to an embodiment of the present application, the characteristic information acquisition unit may be mounted at each vehicle door. The storage unit is configured to store pieces of human body characteristic information and pieces of identity information corresponding to the pieces of human body characteristic information. The matching unit is configured to match the human body characteristic information acquired by the characteristic information acquisition unit with the pieces of human body characteristic information stored in the storage unit, and determine identity information corresponding to the human body characteristic information acquired by the characteristic information acquisition unit according to a result of the matching. The control unit is configured to control facilities in a vehicle according to the determined identity information. The identity information may include, but is not limited to, specific identity, preferences and the like. For example, the identity may be "driver" or "passenger", and the preference may include position and/or angle of a seat, favorite music style, an exterior body color of the vehicle and the like. It should be noted that "matching" two pieces of information as used herein refers to comparing the two pieces of information and determining whether the two pieces of information match or not.

According to an embodiment of the present application, the storage unit may be implemented by various non-volatile memories such as a SD card. The matching unit and the control unit of the vehicle-carried system according to an embodiment of the present application may be implemented by software, hardware and/or firmware.

According to the vehicle-carried system of the present application, human body characteristic information of a person to enter into the vehicle may be acquired by the characteristic information acquisition unit. When the acquired human body characteristic information matches with a piece of the human body characteristic information stored in the storage unit, it indicates that the person to enter into the vehicle is a safe user. In this case, the matching unit may determine the identity information of the person, and the control unit may control the facilities in the vehicle (e.g., the driver's seat) according to the determined identity information, thus saving time and effort on personalized control for vehicle driving.

According to an embodiment of the present application, the control unit may include at least one of a seat control module, a music play control module and an exterior body color control module.

When the human body characteristic information acquired by the characteristic information acquisition unit matches with a piece of the human body characteristic information stored in the storage unit, the matching unit may obtain identity information corresponding to the human body characteristic information acquired by the characteristic information acquisition unit from the storage unit. In this case, the seat control module may control a position of the seat according to the obtained identity information; the music play control module may control the music to be played to fit the favorite music style of the user according to the obtained identity information; and the exterior body color control module may control the exterior body color of the vehicle to the favorite color of the user according to the obtained identity information. In this case, the outer shell of the vehicle may include electrochromic material.

When the control unit of the vehicle-carried system includes the music play control module, the vehicle-carried system may further include a sorting unit. In a case where a plurality of people are in the vehicle, the sorting unit may sort priorities of the people according to a stored sorting mode, and the music play control module may control a play order of music according to the priorities of the people.

For example, in a case where the vehicle is used by a family including a father, a mother and a child, once the characteristic information acquisition unit completes the acquisition of the human body characteristic information of all people to enter into the vehicle and the identity information (namely, "father", "mother" and "child") of each individual is successfully determined by the matching unit, the sorting unit may sort the priorities of the individuals entering into the vehicle according to the stored sorting mode. For example, a result of sorting may be that the priority of the child is higher than the priority of the mother and the priority of the mother is higher than the priority of the father. Then, the music play control module may control the music to be played to fit the favorite music style of the child. According to an embodiment of the present application, the sorting mode may be stored in the storage unit of the vehicle-carried system in advance.

According to an embodiment of the present application, the vehicle-carried system may further include a speech recognition unit and an alarm unit. The speech recognition unit may be configured to recognize speech information, and the alarm unit may be configured to compare the speech information recognized by the speech recognition unit with pieces of stored alarm speech information, and make an alarm according to a result of the comparison. According to an embodiment of the present application, the alarm speech information may be stored in the storage unit of the vehicle-carried system in advance.

By having the alarm speech information (e.g., a code word) stored in advance, a person in the vehicle may speak the code word in case of danger, and the speech recognition unit of the vehicle-carried system may recognize the speech information spoken by the person and the alarm unit compares the recognized speech information with the pieces of stored alarm speech information. In a case where the comparison succeeds, i.e., the comparison result indicates that the recognized speech information is a piece of alarm speech information, an alarm (e.g., a call to the police) is made automatically to ensure personal safety of the people in the vehicle.

According to an embodiment of the present application, the vehicle-carried system may further include a vehicle display unit configured to perform display according to the determined identity information in a case where the matching unit performs the matching successfully.

For example, when the vehicle-carried system includes one vehicle display unit and only one passenger enters into the vehicle, the vehicle display unit may display contents preferred by the passenger according to the determined identity information; and in a case where a plurality of people enter into the vehicle, the vehicle display unit may perform display according to, for example, the sorting result of the sorting unit. However, the present application is not limited thereto, and the vehicle-carried system may include a plurality of vehicle display units disposed in front of the co-pilot's seat and the rear seats, respectively. In this case, the vehicle display units may each display different contents according to the identity information determined at corresponding positions (e.g., vehicle doors through which the passengers enter into the vehicle), respectively.

Figure 2:
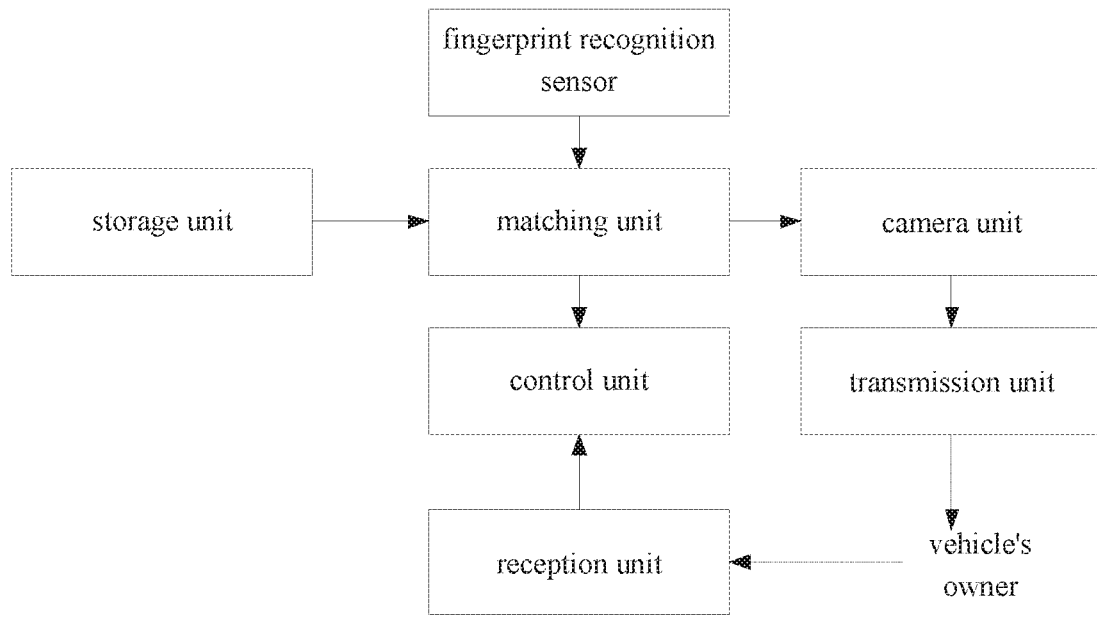
FIG. 2 is a schematic block diagram of a vehicle-carried system according to another embodiment of the present application.

FIG. 2 is a schematic block diagram of a vehicle-carried system according to another embodiment of the present application.

As illustrated in FIG. 2, the vehicle-carded system according to an embodiment may include a characteristic information acquisition unit, a storage unit, a matching unit and a control unit, wherein the characteristic information acquisition unit may include a fingerprint recognition sensor configured to acquire fingerprint information.

The storage unit may store pieces of fingerprint information of persons allowed to enter into the vehicle and pieces of identity information corresponding to the pieces of fingerprint information in advance.

According to an embodiment of the present application, the fingerprint recognition sensor may be mounted on at least one of the vehicle doors. When a finger of a person to enter into the vehicle presses the fingerprint recognition sensor at the vehicle door, the fingerprint recognition sensor acquires the fingerprint information and transmits the acquired fingerprint information to the matching unit. The matching unit matches the fingerprint information acquired by the fingerprint recognition sensor with the pieces of fingerprint information stored in the storage unit. In a case where the matching succeeds, the vehicle door is unlocked and opened, and in the meanwhile the control unit may control the facilities inside the vehicle according to the identity information determined by the matching unit.

According to an embodiment of the present application, the fingerprint recognition sensor may be disposed at each vehicle door. When a plurality of people take the vehicle at the same time, the fingerprint recognition sensors disposed at respective vehicle doors may acquire fingerprint information of the people to enter into the car, respectively, and transmit the acquired fingerprint information to the matching unit. The matching unit may match, with the pieces of fingerprint information stored in the storage unit, the fingerprint information acquired by the fingerprint recognition sensor disposed on the vehicle door at the driver's position. In a case where the matching succeeds, the vehicle door is unlocked and opened. In addition, the control unit may control the facilities inside the vehicle according to the identity information determined by the matching unit.

According to an embodiment of the present application, the vehicle-carried system may further include a camera unit and a transmission unit. The camera unit may be configured to take a picture in a case where the matching unit fails to match the human body characteristic information including the fingerprint information with any piece of human body characteristic information stored in the storage unit, and the transmission unit may be configured to transmit the picture taken by the camera unit to the vehicle's owner.

When the fingerprint information of a person to enter into the vehicle acquired by the fingerprint recognition sensor does not match with any piece of fingerprint information stored in the storage unit, the camera unit is enabled and takes a picture of the person, and then the transmission unit transmits the picture of the person to the vehicle's owner. When the owner receives through, for example, a mobile terminal, the picture transmitted from the vehicle-carried system, the owner may determine whether the person to enter into the vehicle is a safe user or not, namely, whether the person is allowed by the owner to enter into the vehicle. If the owner determines that the person to enter into the vehicle is not a safe user, he may call the police.

According to an embodiment of the present application, a predetermined threshold value may be set, and when the number of times for which the fingerprint information of a person to enter into the vehicle acquired by the fingerprint recognition sensor does not match with the pieces of fingerprint information stored in the storage unit exceeds the threshold value, the camera unit is enabled and takes a picture of the person, and then the transmission unit transmits the picture of the person to the vehicle's owner.

According to an embodiment of the present application, the vehicle-carried system may further include a reception unit configured to receive control information sent by the vehicle's owner, and control a vehicle door to be either opened or not opened according to the control information. For example, when the vehicle's owner determines that the person to enter into the vehicle is a safe user according to the received picture taken by the camera unit of the vehicle-carried system, the owner may send control information to control the vehicle door to be opened so as to allow the person to enter into the vehicle, thereby achieving remote security control for the vehicle.

According to an embodiment of the present application, the camera unit may be implemented as a camera head or a digital camera. In addition, the transmission unit and the reception unit of the vehicle-carried system according to an embodiment of the present application may be implemented according to various wireless communication protocols.

Furthermore, although not shown in the drawings, the vehicle-carried system according to the embodiment may further include at least one of the functional units described with reference to FIG. 1.

Figure 3:
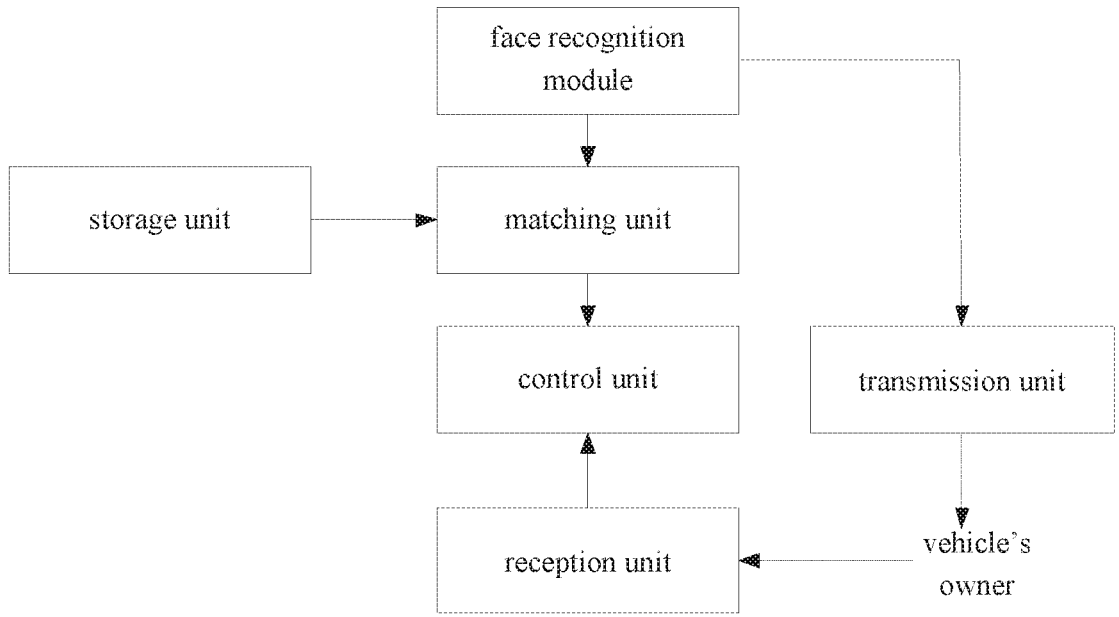
FIG. 3 is a schematic block diagram of a vehicle-carried system according to another embodiment of the present application.

FIG. 3 is a schematic block diagram of a vehicle-carried system according to another embodiment of the present application.

As illustrated in FIG. 3, the vehicle-carried system according to the embodiment may include a characteristic information acquisition unit, a storage unit, a matching unit and a control unit, wherein the characteristic information acquisition unit may include a face recognition module configured to acquire facial information.

The storage unit may store pieces of facial information of persons allowed to enter into the vehicle and pieces of identity information corresponding to the pieces of facial information in advance.

The vehicle-carried system according to the embodiment includes the face recognition module. When a person operates a vehicle provided with the vehicle-carried system, firstly, facial information of the person operating the vehicle is acquired by the face recognition module and transmitted to the matching unit. Then, the matching unit matches the facial information acquired by the face recognition module with the pieces of facial information stored in the storage unit. If the matching succeeds, the identity information determined according to the facial information is transmitted to the control unit, which may control the facilities inside the vehicle according to the determined identity information.

According to an embodiment of the present application, the vehicle-carried system may further include a transmission unit configured to transmit the facial information acquired by the face recognition module in a case where the human body characteristic information including the facial information fails to be matched with any piece of human body characteristic information stored in the storage unit. When the owner receives through, for example, a mobile terminal, the facial information transmitted from the vehicle-carried system, the owner may determine whether the person to enter into the vehicle is a safe user or not, namely, whether the person is allowed by the owner to enter into the vehicle. If the owner determines that the person to enter into the vehicle is not a safe user, he may call the police.

According to an embodiment of the present application, the vehicle-carried system may further include a reception unit configured to receive control information sent by the vehicle's owner, and control a vehicle door to be either opened or not opened according to the control information. For example, when the vehicle's owner determines that the person to enter into the vehicle is a safe user according to the received facial information acquired by the face recognition module of the vehicle-carried system, the owner may send control information to control the vehicle door to be opened so as to allow the person to enter into the vehicle, thereby achieving remote security control for the vehicle.

Furthermore, although not shown in the drawings, the vehicle-carried system according to the embodiment may further include at least one of the functional units described with reference to FIG. 1.

Figure 4:
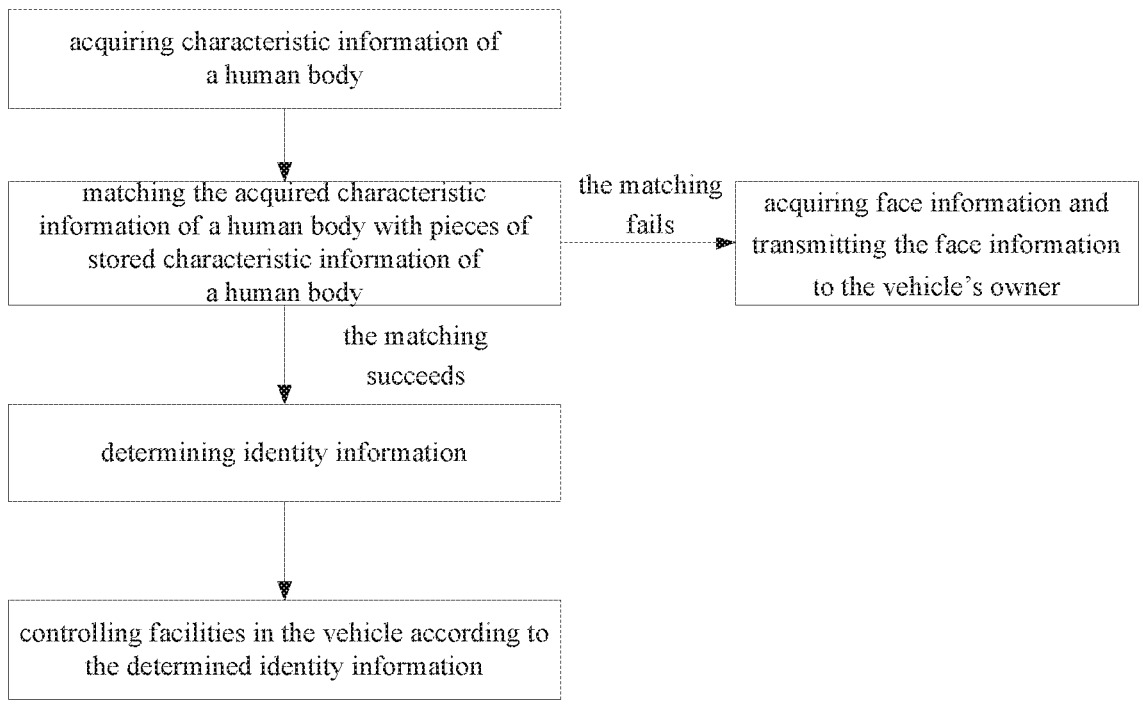
FIG. 4 is a schematic flow chart of a control method for vehicle facilities according to an embodiment of the present application.

FIG. 4 is a schematic flow chart of a control method for vehicle facilities according to an embodiment of the present application.

As illustrated in FIG. 4, the control method for vehicle facilities according to an embodiment includes:
acquiring human body characteristic information:
matching the acquired human body characteristic information with pieces of stored human body characteristic information, and determining identity information corresponding to the acquired human body characteristic information according to a result of the matching; and
controlling facilities in the vehicle according to the determined identity information.

The human body characteristic information may include fingerprint information and/or facial information. During the matching, the acquired human body characteristic information is matched with the stored human body characteristic information, and if the matching succeeds, corresponding identity information is determined according to a matching piece of human body characteristic information. Once the matching succeeds, facilities inside the vehicle may be controlled according to the determined identity information.

In addition, in a case where the acquired human body characteristic information fails to be matched any piece of stored human body characteristic information, the control method may further include: acquiring facial information and transmitting the facial information to the vehicle's owner.

For example, when the acquired human body characteristic information of a person to enter into the vehicle does not match with any piece of stored human body characteristic information, a picture may be taken for the person by the camera unit, and transmitted by the transmission unit to the vehicle's owner. The owner may determine whether the person to enter into the vehicle is a safe user or not, namely, whether the person is allowed by the owner to enter into the vehicle. If the person is determined to be not a safe user, the owner may call the police; and if the person is determined to be a safe user, the vehicle may be remotely controlled to open a vehicle door.

It can be understood that the foregoing implementations are merely exemplary implementations used for describing the principle of the present application, but the present application is not limited thereto. Those ordinary skilled in the art may make various variations and improvements without departing from the spirit and essence of the present application, and these variations and improvements shall fall into the protection scope of the present application.

What is claimed is:

1. A vehicle-carried system, comprising:
a characteristic information acquisition unit configured to acquire human body characteristic information;
a storage unit configured to store pieces of human body characteristic information and pieces of identity information corresponding to the pieces of human body characteristic information;
a matching unit configured to match the human body characteristic information acquired by the characteristic information acquisition unit with the pieces of human body characteristic information stored in the storage unit, and determine identity information corresponding to the human body characteristic information acquired by the characteristic information acquisition unit according to a result of the matching; and
a control unit configured to control facilities in a vehicle according to the determined identity information,
wherein the control unit comprises a music play control module, and the vehicle-carried system further comprises a sorting unit, and in a case where a plurality of people are in the vehicle, the sorting unit is configured to sort priorities of the people according to a stored sorting mode, and the music play control module is configured to control a play order of music according to the priorities of the people.

2. The vehicle-carried system according to claim 1, wherein the human body characteristic information comprises fingerprint information, and the characteristic information acquisition unit comprises a fingerprint recognition sensor configured to acquire the fingerprint information.

3. The vehicle-carried system according to claim 2, further comprising a camera unit and a transmission unit,
wherein the camera unit is configured to take a picture in a case where the human body characteristic information comprising the fingerprint information fails to be matched with any piece of human body characteristic information stored in the storage unit, and the transmission unit is configured to transmit the picture taken by the camera unit to a vehicle's owner.

4. The vehicle-carried system according to claim 1, wherein the human body characteristic information comprises facial information, and the characteristic information acquisition unit comprises a face recognition module configured to acquire the facial information.

5. The vehicle-carried system according to claim 4, further comprising a transmission unit configured to transmit the facial information acquired by the face recognition module in a case where the human body characteristic information comprising the facial information fails to be matched with any piece of human body characteristic information stored in the storage unit.

6. The vehicle-carried system according to claim 1, further comprising a reception unit configured to receive control information sent by a vehicle's owner, and control a vehicle door to be either opened or not opened according to the control information.

7. The vehicle-carried system according to claim 1, wherein the control unit further comprises at least one of a seat control module and an exterior body color control module.

8. The vehicle-carried system according to claim 1, further comprising a speech recognition unit and an alarm unit,
wherein the speech recognition unit is configured to recognize speech information, and
the alarm unit is configured to compare the speech information recognized by the speech recognition unit with pieces of stored alarm speech information, and make an alarm according to a result of the comparison.

9. The vehicle-carried system according to claim 1, further comprising a vehicle display unit, which is configured to display contents preferred by a passenger according to the determined identity information in a case where the matching unit performs the matching successfully.

10. The vehicle-carried system according to claim 1, wherein the vehicle-carried system comprises a plurality of characteristic information acquisition units disposed on vehicle doors, respectively.

11. A control method for vehicle facilities, comprising:
acquiring human body characteristic information;
matching the acquired human body characteristic information with pieces of stored human body characteristic information, and determining identity information corresponding to the acquired human body characteristic information according to a result of the matching; and
controlling facilities in the vehicle according to the determined identity information,
wherein the control method uses a control unit comprising a music play control module and a sorting unit, and in a case where a plurality of people are in the vehicle, the sorting unit is configured to sort priorities of the people according to a stored sorting mode, and the music play control module is configured to control a play order of music according to the priorities of the people.

12. The control method for vehicle facilities according to claim 11, wherein acquiring the human body characteristic information comprises:
acquiring fingerprint information; or
acquiring facial information.

13. The control method for vehicle facilities according to claim 11, further comprising:
acquiring facial information and transmitting the facial information to a vehicle's owner in a case where the acquired human body characteristic information fails to be matched with any piece of stored human body characteristic information.

* * * * *